Figure 1:
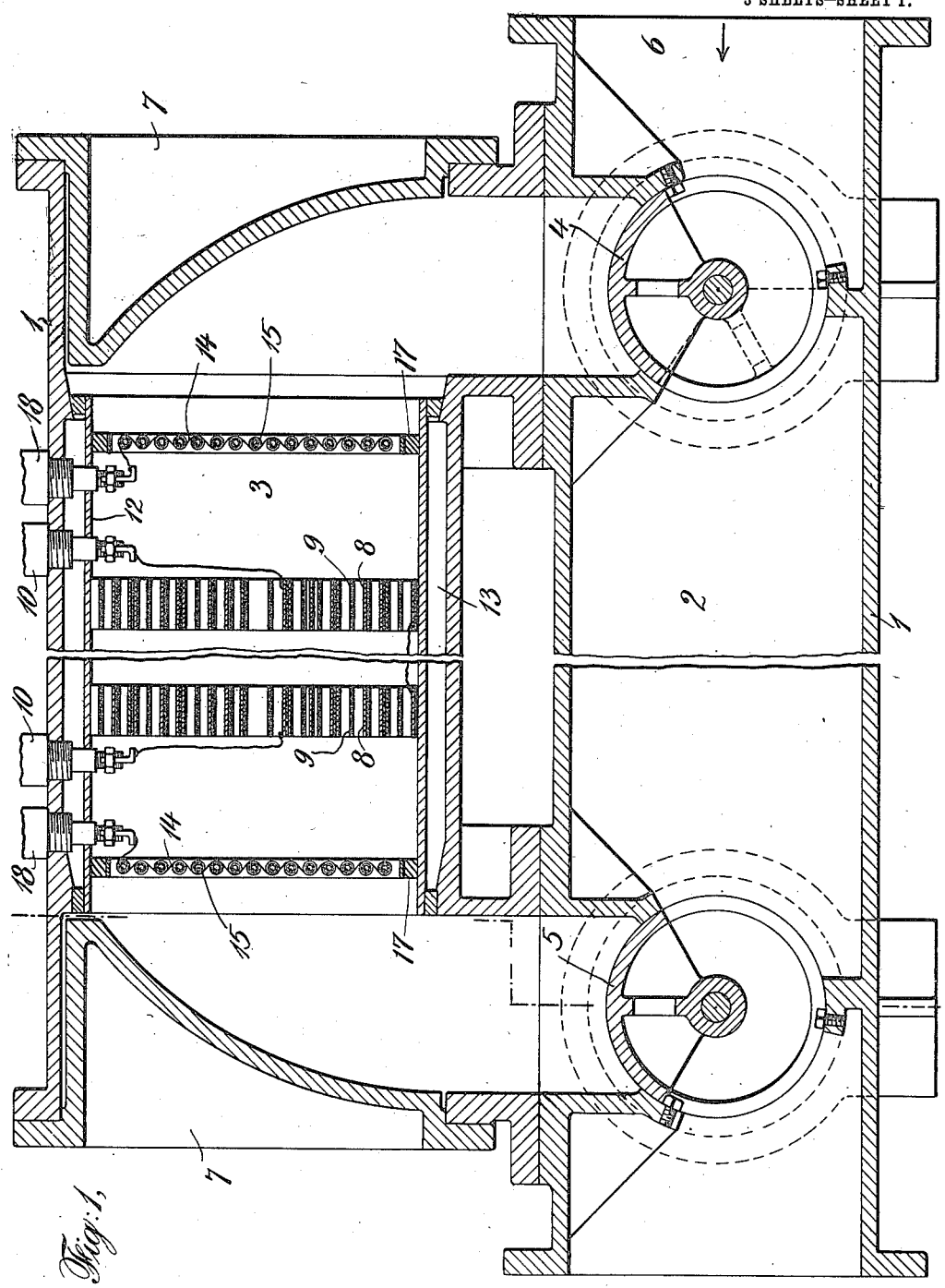

C. C. THOMAS.
STEAM AND GAS METER AND CALORIMETER.
APPLICATION FILED NOV. 1, 1909.

1,043,983.

Patented Nov. 12, 1912.

3 SHEETS—SHEET 1.

Witnesses:
Paul H. Frank
Louis Edw. Campbell

Inventor
Carl C. Thomas
By his Attorneys

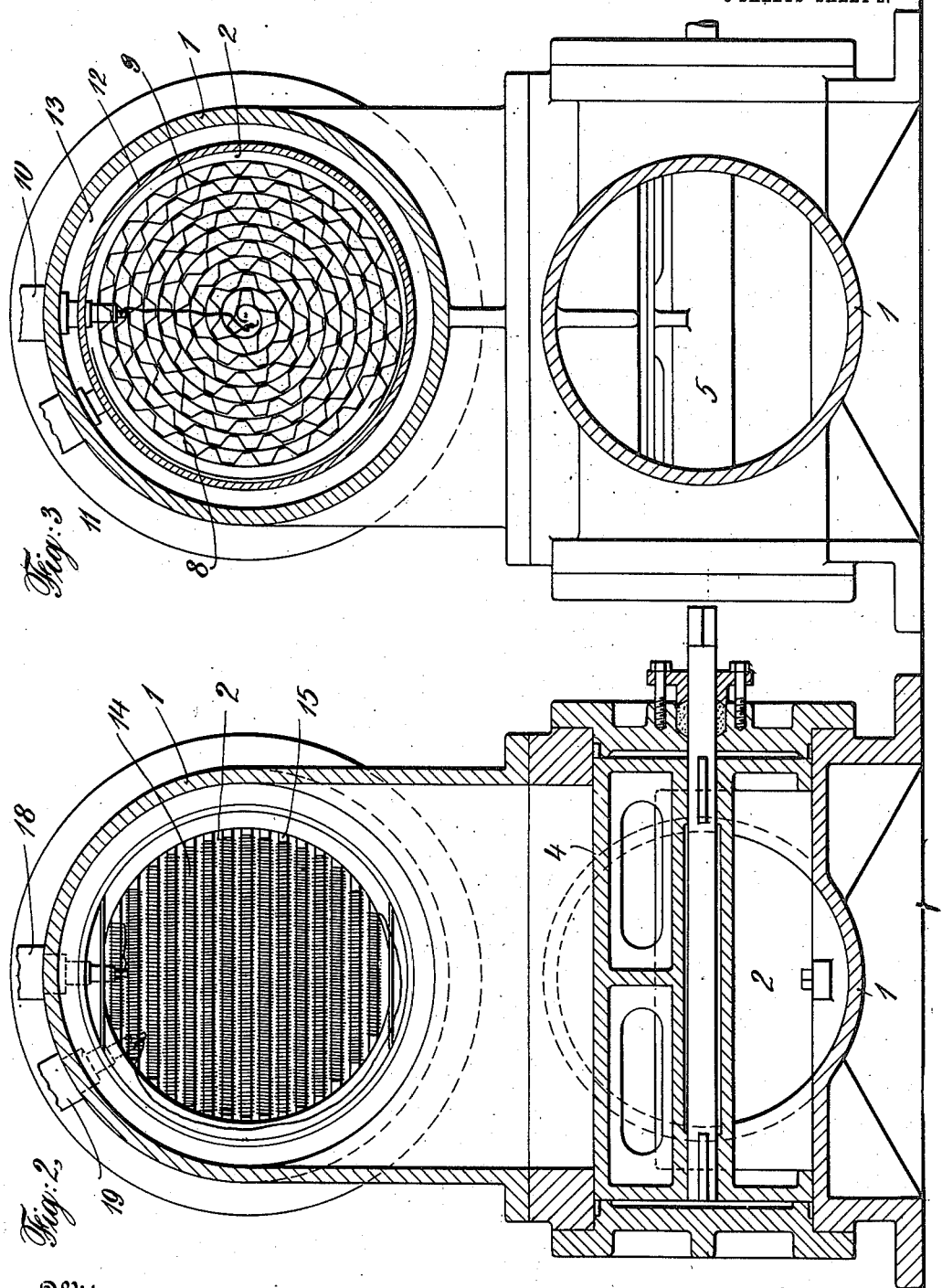

C. C. THOMAS.
STEAM AND GAS METER AND CALORIMETER.
APPLICATION FILED NOV. 1, 1909.
1,043,983.
Patented Nov. 12, 1912.
3 SHEETS—SHEET 3.
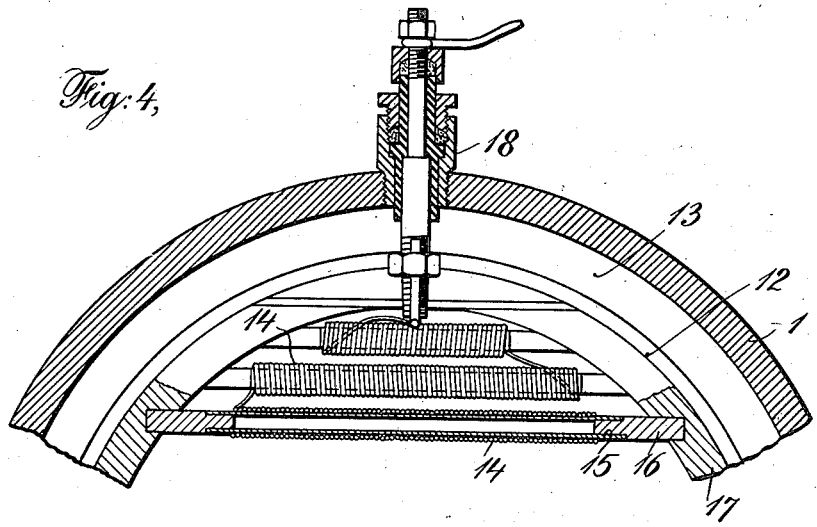
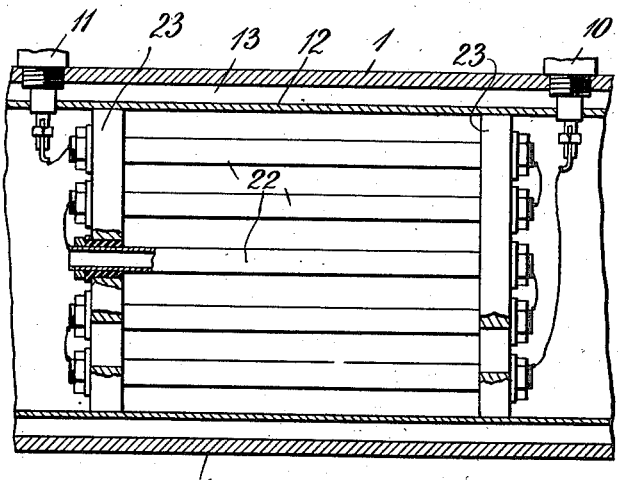
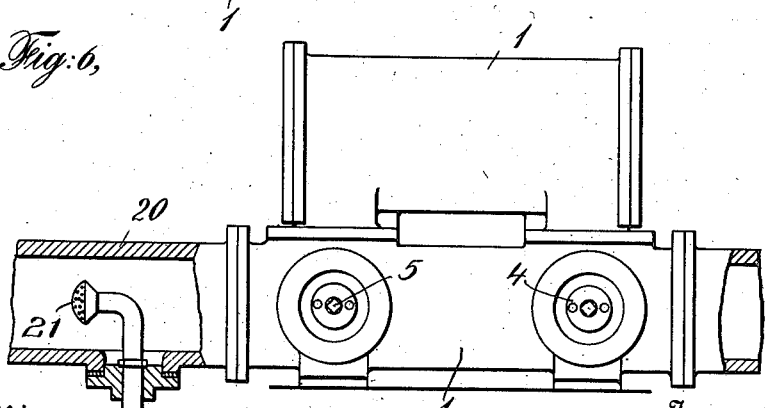

UNITED STATES PATENT OFFICE.

CARL C. THOMAS, OF MADISON, WISCONSIN.

STEAM AND GAS METER AND CALORIMETER.

1,043,983.  Specification of Letters Patent.  Patented Nov. 12, 1912.

Application filed November 1, 1909. Serial No. 525,680.

*To all whom it may concern:*

Be it known that I, CARL C. THOMAS, a citizen of the United States of America, and a resident of the city of Madison, county of Dane, and State of Wisconsin, have invented certain new and useful Improvements in Steam and Gas Meters and Calorimeters, of which the following is a specification.

My invention relates to improvements in steam and gas meters and calorimeters, and embodies improvements upon the calorimeter set forth in my Patent No. 898,610, dated Sept. 15, 1908, and upon the steam and gas meters set forth in my Patent No. 946,886, dated Jan. 18, 1910, and in my application filed Apr. 14, 1909, Sr. No. 489,840.

The device herein described, when used as a calorimeter, operates according to the method set forth and claimed in Patent No. 898,610; and when used as a steam or gas meter, it operates according to the method set forth in said Patent No. 946,886.

The invention consists in various improvements in the construction and arrangement of the parts; in improved heating coils or equivalent devices; and in improved mountings for the variable resistance members of electric thermometers with which the device is provided.

The objects of my invention are to improve, simplify, and render extremely accurate meters and calorimeters such as referred to; to adapt same for permanent location in gas or steam mains; to avoid flow of steam or gas through the apparatus when its use is not required; to provide improved heating means; to provide improved mountings for the variable-resistance members of the electric thermometers employed in connection with the apparatus; and to make the apparatus simple, easy to construct, and durable.

I will now proceed to describe my invention with reference to the accompanying drawings, in which an apparatus embodying my invention is illustrated.

In said drawings: Figure 1 shows a central longitudinal section of the improved meter or calorimeter; Fig. 2 shows a transverse section of the device on the center line of one of the valves; Fig. 3 shows a transverse section of the device through the zone within which the heating coils are located; Fig. 4 shows a detail fragmentary section of the device through one of the electric terminals thereof; Fig. 5 shows a detail fragmentary longitudinal section of the heating conduit of the device, illustrating the use of alternative heating means; and Fig. 6 shows, on a smaller scale, an external elevation of the device, and shows in connection therewith means for reducing superheat of steam or gas which has passed through the device.

The meter or calorimeter herein illustrated and described is intended for permanent location in a steam line, gas main, or other conduit through which flows steam or gas the flow of which is to be measured, or the quality of which is to be determined. It comprises two conduits, one of which is provided with resistance heating means and with the actuating means of electric thermometers for measuring the temperature of the steam or gas passing through such conduit before and after it has passed the resistance heating means; together with valves whereby the steam or gas may be caused to pass through the one conduit or the other, at will.

In the drawings, 1 designates a casing having within it two conduits, 2 and 3, and rotary valves 4 and 5, of familiar type, whereby steam or gas entering the device at 6, for example, may pass through conduit 2 or conduit 3, at the will of the operator. For convenience in manufacture, the portions of casing 1 in which conduits 2 and 3 are, are structurally separate, though connected together, both being tubular bodies, the ends of that portion in which conduit 3 is, being closed by end-caps 7, curved at their inner ends to produce curved passages leading to and from conduit 2, and to avoid dead space in this portion of the device.

Within conduit 2 suitable resistance heating devices are provided. In the construction of such heating devices illustrated in Figs. 1 and 3, said resistance devices consist of transversely-corrugated resistance ribbon, 8, rolled spirally into disks, the several layers of which are insulated from one another by electric insulating material 9. The apparatus will be provided with a greater or less number of such resistance disks, according to the conditions of use, an even number being preferably employed, though this is not important. Terminal plugs 10 and 11 are provided for the resistance devices, these devices being customarily connected in circuit in series, though this is not material.

The resistance disks are mounted within a lining cylinder, 12, of suitable heat-insulating material, such as wood or porcelain, said lining fitting within conduit 2; there being between the lining and the wall of the conduit an air space 13, which space also serves to reduce radiation of heat.

Near the two ends of the conduit 2 are located the variable-resistance actuating devices of electric thermometers. Such variable resistance means comprise coils 14 of metal which changes its electrical resistance with variation of temperature, said coils being mounted on a suitable support. As shown particularly in Fig. 4, one suitable form of support is a grid, extending transversely across the conduit, and consisting of tubes 15, mounted by means of dowels 16 (of wood or other suitable insulating material) on a ring 17 suspended within the conduit 2; the windings of the different tubes being, customarily, connected in series, as shown, suitable terminal plugs, 18 and 19, being provided for each such thermometer actuating device. As is well known, such thermometer actuating devices are, in use, connected to a source of current and to an electric measuring instrument, the latter serving to measure variation in flow of the current passing through the coils 14.

Normally, that is, when the instrument is not in use, the valves 4 and 5 are set to permit flow through conduit 2 and to prevent flow through conduit 3, the valves being shown in this position in Fig. 1. When it is desired to determine the quantity of steam or the like flowing through the line or main in which the instrument is located, (supposing the steam to be dry), the valves are turned so as to permit flow through conduit 3, and sufficient current is passed through the heating coils to cause the thermometers at the two ends of conduit 3 to indicate a difference in temperature with respect to one another. By a simple calculation, (the specific heat of steam being known), or by reference to calibration tables or curves previously derived, the quantity of steam flowing through the conduit is readily obtained. If the steam is wet, the operation is the same, except that first a sufficient quantity of current is passed through the coils to dry the steam, dryness being indicated when the thermometer at the outlet end of conduit 3 indicates a slightly higher temperature than the thermometer at the inlet end, and then a further additional quantity of current is passed through the coils, and the rise of temperature produced by such additional current is determined. The same operations suffice to determine the rate of flow of other gases, for example, illuminating gas, producer gas, etc., the apparatus being able to handle gases of high temperature.

In determining the quality of steam or other gas by the instrument, the quantity flowing within a given unit of time, or the rate of flow, is determined as above described, and then, by determining the current required to heat the steam to such extent that the thermometer at the discharge end indicates a slightly higher temperature than that at the admission end, the quality is readily determined by calculation or by calibration curves or tables.

One great advantage of this instrument, as compared with meters of other types, is that it contains no moving or working parts, for which reason it is particularly suitable for measuring rates of flow of hot gases, such for example as hot producer gas, hot blast furnace gas, etc. It does not require correction for variation in volume of the gas due to change of temperature or pressure, since it measures the mass of the gas flowing, rather than its volume. Slight fluctuations in pressure, such as those caused by the variable suction of a gas engine, or the variable discharge of a compressor, do not affect it, since there is sufficient time lag to the thermometers and heaters to cause average results to be given. While calculation of results in not necessary, the instrument lends itself to calculation with a considerable degree of accuracy; which is important in corroborating or disproving the results obtained by means of calibration curves.

A very important advantage of the apparatus is that it acts upon the entire quantity of steam or other gas flowing, and so is not affected by inaccuracies due to improper placing of a sampling tube or other device for drawing off a portion of the gas or steam for test. The thermometers at the two ends of conduit 3, being mounted on grids which extend clear across said conduit, measure with accuracy the average temperature of the steam or gas flowing through that conduit; and the heaters, since they extend across the conduit 3, heat uniformly the entire body of gas flowing.

In some cases, as for example, when the instrument is employed for measuring the amount of steam supplied to a steam engine, it is not desired to have the steam pass from the apparatus to the engine or other steam uses in a superheated condition; for many engines are not adapted for using superheated steam. In such cases I provide, in the pipe 20 leading from the instrument, a water injection device 21 (Fig. 6), whereby sufficient water is added to bring the steam or other gas to the desired condition, so counteracting the superheat supplied to such steam or gas in the apparatus.

Various other arrangement of heaters may be employed. One such alternative arrangement is illustrated in Fig. 5, in which I have shown, within the conduit 2, tubes 22 of suitable resistance metal, mounted in tube plates 23; the tubes being open, from one end to the other, for the flow of steam or gas through them, the tube plates being also open, if desired, for the flow of the steam or gas around and between said tubes.

What I claim is:—

1. Apparatus such as described, comprising in combination a casing, a liner therein inclosing between itself and the walls of said casing a heat insulating space, electric heating means within said liner and temperature determining means on opposite sides of said heating means.

2. Apparatus such as described comprising in combination, a conduit, a lining of heat insulating material therein, electric heating means within said conduit, and temperature determining means on opposite sides of said heating means.

3. Apparatus such as described comprising in combination a conduit, electric heating means therein comprising one or more transverse foraminous disks each composed of a corrugated strip of resistance material interwound with a strip of insulating material separating the layers of the resistance material, the said disks providing openings for the passage of steam or gas, and temperature determining means in the path of steam or gas passing through said conduit.

4. Apparatus such as described comprising in combination a conduit, heating means therein, and temperature determining means therein comprising a grid extending transversely of the conduit, and carrying the actuating means of a thermometric device.

5. Apparatus such as described comprising in combination a conduit, heating means therein, and temperature determining means therein comprising a grid extending transversely of the conduit, and carrying the variable resistance conductor of an electric thermometer.

In testimony whereof I have signed this specification in the presence of two subscribing witnesses.

CARL C. THOMAS.

Witnesses:
 GRACE THOMAS,
 E. F. RILEY.